United States Patent
Roh et al.

(10) Patent No.: US 10,625,619 B2
(45) Date of Patent: Apr. 21, 2020

(54) BATTERY MODULE, BATTERY PACK COMPRISING BATTERY MODULE, AND VEHICLE COMPRISING BATTERY PACK

(71) Applicant: LG CHEM, LTD., Seoul (KR)

(72) Inventors: Tae-Hwan Roh, Daejeon (KR); Yu-Na Kwon, Daejeon (KR); Sung-Gon Kim, Daejeon (KR); Tae-Hyuck Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 147 days.

(21) Appl. No.: 15/752,124

(22) PCT Filed: Jan. 25, 2017

(86) PCT No.: PCT/KR2017/000910
§ 371 (c)(1),
(2) Date: Feb. 12, 2018

(87) PCT Pub. No.: WO2017/146384
PCT Pub. Date: Aug. 31, 2017

(65) Prior Publication Data
US 2018/0229621 A1    Aug. 16, 2018

(30) Foreign Application Priority Data

Feb. 22, 2016   (KR) ........................ 10-2016-0020679

(51) Int. Cl.
*H01M 2/10*   (2006.01)
*H01M 2/26*   (2006.01)
(Continued)

(52) U.S. Cl.
CPC ........... *B60L 11/1877* (2013.01); *B60L 50/50* (2019.02); *B60L 50/66* (2019.02); *H01M 2/10* (2013.01);
(Continued)

(58) Field of Classification Search
CPC ...... B60L 11/1877; B60L 50/50; B60L 50/66; H01M 10/04; H01M 10/0413;
(Continued)

(56) References Cited

U.S. PATENT DOCUMENTS 8,609,276 B2   12/2013   Han et al.
9,178,192 B2   11/2015   Payne
(Continued)

FOREIGN PATENT DOCUMENTS

JP   2007-109548 A      4/2007
JP   WO2011-148641 A1   12/2011
(Continued)

OTHER PUBLICATIONS

International Search Report for PCT/KR2017/000910 (PCT/ISA/210) dated May 22, 2017.

*Primary Examiner* — Carlos Barcena
(74) *Attorney, Agent, or Firm* — Birch, Stewart, Kolasch & Birch, LLP

(57) ABSTRACT

Disclosed is a battery module, which includes a battery cell assembly having a plurality of battery cells stacked on one another so that a pair of electrode leads protrudes on one side of each battery cell; and an ICB assembly configured to cover one side of the battery cell assembly to electrically connect the pair of electrode leads of the plurality of battery cells, the ICB assembly having a plurality of lead slots through each of which electrode leads of two battery cells facing each other pass in common.

14 Claims, 13 Drawing Sheets

(51) Int. Cl.
  *H01M 2/20* (2006.01)
  *H01M 10/04* (2006.01)
  *H01M 10/42* (2006.01)
  *B60L 11/18* (2006.01)
  *H01M 2/24* (2006.01)
  *B60L 50/50* (2019.01)
  *B60L 50/60* (2019.01)

(52) U.S. Cl.
  CPC ....... *H01M 2/1066* (2013.01); *H01M 2/1077* (2013.01); *H01M 2/20* (2013.01); *H01M 2/206* (2013.01); *H01M 2/24* (2013.01); *H01M 2/26* (2013.01); *H01M 10/0413* (2013.01); *H01M 10/425* (2013.01); *H01M 2/204* (2013.01); *H01M 10/04* (2013.01); *H01M 2220/20* (2013.01)

(58) Field of Classification Search
  CPC .. H01M 10/425; H01M 2220/20; H01M 2/10; H01M 2/1066; H01M 2/1077; H01M 2/20; H01M 2/204; H01M 2/206; H01M 2/24; H01M 2/26
  See application file for complete search history.

(56) References Cited

U.S. PATENT DOCUMENTS

| | | | |
|---|---|---|---|
| 9,385,360 B2* | 7/2016 | Stoughton | H01M 2/1061 |
| 2013/0065103 A1 | 3/2013 | Yumura | |
| 2013/0101883 A1 | 4/2013 | Zhao | |
| 2013/0216878 A1 | 8/2013 | Merriman et al. | |
| 2014/0023909 A1 | 1/2014 | Suzuki | |
| 2014/0377634 A1 | 12/2014 | Nakajyo | |
| 2015/0263394 A1 | 9/2015 | Yoshioka | |
| 2018/0287110 A1* | 10/2018 | Yanagihara | H01M 2/10 |

FOREIGN PATENT DOCUMENTS

| | | |
|---|---|---|
| JP | 2014-086360 A | 5/2014 |
| JP | 2014-532958 A | 12/2014 |
| KR | 10-2012-0127188 A | 11/2012 |
| KR | 10-2013-0023059 A | 3/2013 |
| KR | 10-2014-0056835 A | 5/2014 |
| KR | 10-2014-0093424 A | 7/2014 |
| KR | 10-2014-0144941 A | 12/2014 |
| WO | WO 2012/131801 A1 | 10/2012 |

* cited by examiner

BATTERY MODULE, BATTERY PACK COMPRISING BATTERY MODULE, AND VEHICLE COMPRISING BATTERY PACK

TECHNICAL FIELD

The present disclosure relates to a battery module, a battery pack including the battery module, and a vehicle including the battery pack.

The present application claims priority to Korean Patent Application No. 10-2016-0020679 filed on Feb. 22, 2016 in the Republic of Korea, the disclosures of which are incorporated herein by reference.

BACKGROUND ART

Secondary batteries which are highly applicable to various products and exhibit superior electrical properties such as high energy density, etc. are commonly used not only in portable devices but also in electric vehicles (EVs) or hybrid electric vehicles (HEVs) driven by electrical power sources. The secondary battery is drawing attentions as a new energy source for enhancing energy efficiency and environment friendliness in that the use of fossil fuels can be reduced greatly and no byproduct is generated during energy consumption.

Secondary batteries widely used at the preset include lithium ion batteries, lithium polymer batteries, nickel cadmium batteries, nickel hydrogen batteries, nickel zinc batteries and the like. An operating voltage of the unit secondary battery cell, namely a unit battery cell, is about 2.5V to 4.2V. Therefore, if a higher output voltage is required, a plurality of battery cells may be connected in series to configure a battery pack. In addition, depending on the charge/discharge capacity required for the battery pack, a plurality of battery cells may be connected in parallel to configure a battery pack. Thus, the number of battery cells included in the battery pack may be variously set according to the required output voltage or the demanded charge/discharge capacity.

Meanwhile, when a plurality of battery cells are connected in series or in parallel to configure a battery pack, it is common to configure a battery module composed of at least one battery cell first, and then configure a battery pack by using at least one battery module and adding other components.

A conventional battery module generally includes a battery cell assembly having a plurality of stacked battery cells and an ICB assembly mounted to one side of the battery cell assembly and having sensing bus bars for electrically connecting pairs of electrode leads of the plurality of battery cells.

In the conventional battery module, after the ICB assembly is mounted to one side of the battery cell assembly, a pair of electrode leads of the battery cells passing through the lead slots of the ICB assembly and sensing bus bars of the ICB assembly are connected by laser welding or the like.

Here, the lead slots of the ICB assembly are generally provided in a number correspond to the number of the pair of electrode leads of the battery cells, and the electrode leads respectively passing through the lead slots are bent to make surface contact with the sensing bus bars and welded to the sensing bus bars. At this time, the sensing bus bars are placed between electrode leads facing each other, and the facing electrode leads are bent in opposite directions toward the sensing bus bar to make surface contact with the sensing bus bar and then welded to the sensing bus bar.

However, in the conventional battery module, since the lead slots are required in the ICB assembly as much as the number of the electrode cells, the number of lead slots is increased according to the number of the electrode leads, and intervals of the lead slots are relatively narrowed. Thus, the efficiency of the assembling process may be deteriorated according to the number of electrode leads.

Also, in the conventional battery module, when the facing electrode leads are bent for welding to the sensing bus bar disposed between the facing electrode leads, the facing electrode leads are bent opposite directions toward the sensing bus bar, which demands two or more bending directions. This also acts as a factor for hindering the efficiency of the assembling process.

Therefore, in the battery module, it is required to find a way to improve the efficiency of the assembling process when the ICB assembly is assembled to the battery cell assembly.

DISCLOSURE

Technical Problem

The present disclosure is directed to providing a battery module which may improve the efficiency of the assembling process when an ICB assembly is assembled to a battery cell assembly, a battery pack including the battery module, and a vehicle including the battery pack.

Technical Solution

In one aspect of the present disclosure, there is provided a battery module, comprising: a battery cell assembly having a plurality of battery cells stacked on one another so that a pair of electrode leads protrudes on one side of each battery cell; and an ICB assembly configured to cover one side of the battery cell assembly to electrically connect the pair of electrode leads of the plurality of battery cells, the ICB assembly having a plurality of lead slots through each of which electrode leads of two battery cells facing each other pass in common.

The ICB assembly may include: an ICB frame configured to cover one side of the battery cell assembly and having the plurality of lead slots; and a plurality of sensing bus bars provided at the ICB frame and electrically connected to the electrode leads passing through the plurality of lead slots in common, respectively, and the plurality of lead slots may be disposed between the plurality of sensing bus bars, respectively The electrode leads passing through each lead slot in common may be bent in at least one direction and electrically connected to sensing bus bars adjacent thereto.

The ICB assembly may include a plurality of short-preventing ribs disposed between the lead slots and the sensing bus bars, respectively, to prevent a short circuit between the electrode leads passing through each lead slot in common.

The electrode leads bent in at least one direction may be coupled to sensing bus bars adjacent thereto by means of welding.

The at least one direction may be a front direction or a rear direction of the ICB assembly.

The plurality of lead slots may include: a plurality of first slots through which any one electrode leads among the pair of electrode leads of the facing battery cells pass in common; and a plurality of second slots through which the other one electrode leads among the pair of electrode leads of the facing battery cells pass in common.

The plurality of sensing bus bars may include: a plurality of first bus bars electrically connected to the electrode leads passing through the plurality of first slots in common, respectively; and a plurality of second bus bars electrically connected to the electrode leads passing through the plurality of second slots in common, respectively.

The plurality of short-preventing ribs may include: a plurality of first insulating ribs disposed between the first slots and the first bus bars, respectively; and a plurality of second insulating ribs disposed between the second slots and the second bus bars, respectively.

The ICB assembly may include a PCB unit provided at the ICB frame to be disposed between the plurality of first bus bars and the plurality of second bus bars and electrically connected to the plurality of first bus bars and the plurality of second bus bars.

In addition, the present disclosure provides a battery pack, comprising: at least one battery module according to the above embodiments; and a pack case configured to package the at least one battery module.

Moreover, the present disclosure provides a vehicle, comprising at least one battery pack according to the above embodiment.

Advantageous Effects

According to various embodiments as above, it is possible to provide a battery module which may improve the efficiency of the assembling process when an ICB assembly is assembled to a battery cell assembly, a battery pack including the battery module, and a vehicle including the battery pack.

Thus, it is possible to provide a battery module which may increase mass productivity of the battery module and improve the quality of the battery module by shortening the assembly time of the battery module, a battery pack including the battery module, and a vehicle including the battery pack.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

The present disclosure will become more apparent by describing in detail the embodiments of the present disclosure with reference to the accompanying drawings. It should be understood that the embodiments disclosed herein are illustrative only for better understanding of the present disclosure, and that the present disclosure may be modified in various ways. In addition, for ease understanding of the present disclosure, the accompanying drawings are not drawn to real scale, but the dimensions of some components may be exaggerated.

Figure 1:
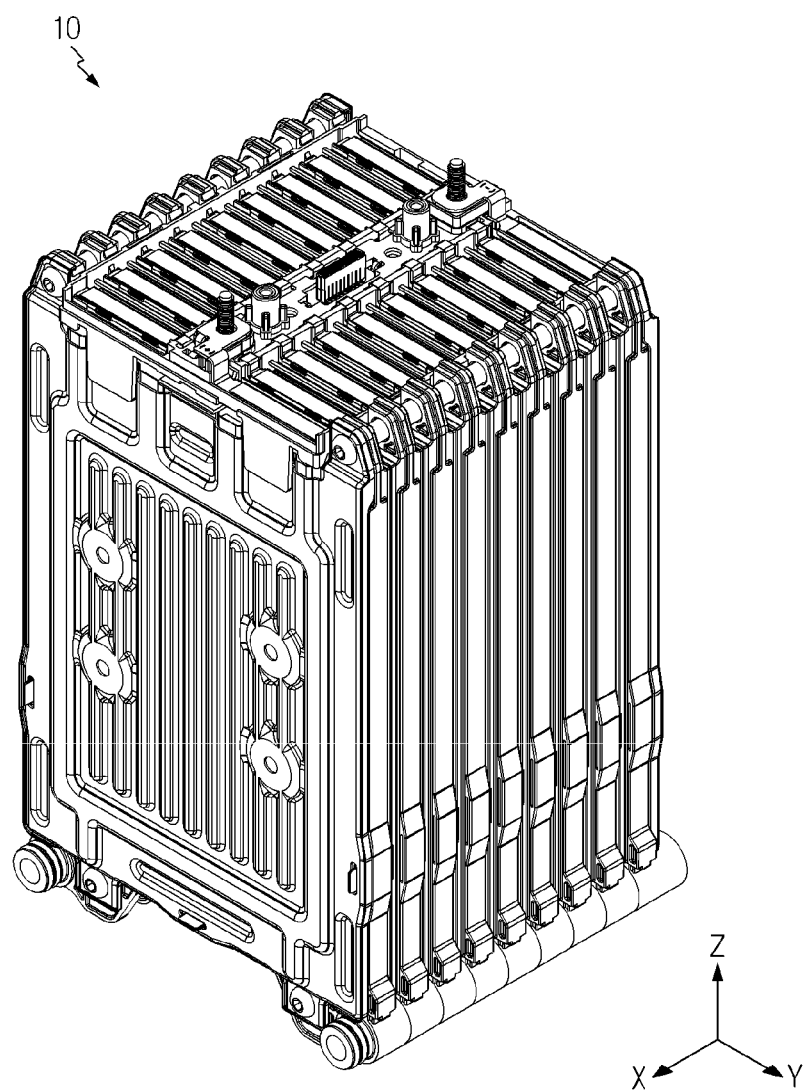
FIG. 1 is a perspective view showing a battery module according to an embodiment of the present disclosure.
Figure 2:
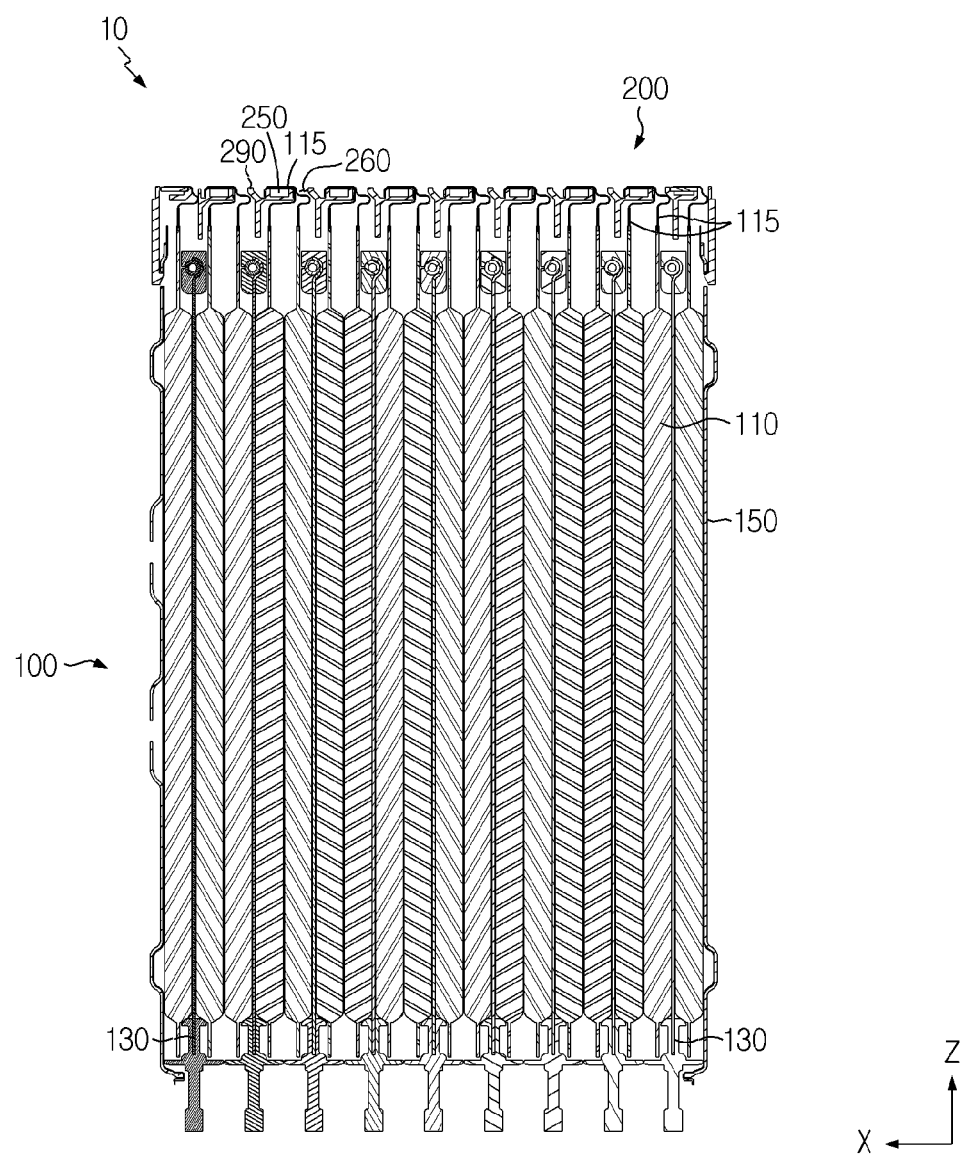
FIG. 2 is a cross-sectioned view showing the battery module of FIG. 1.
Figure 3:
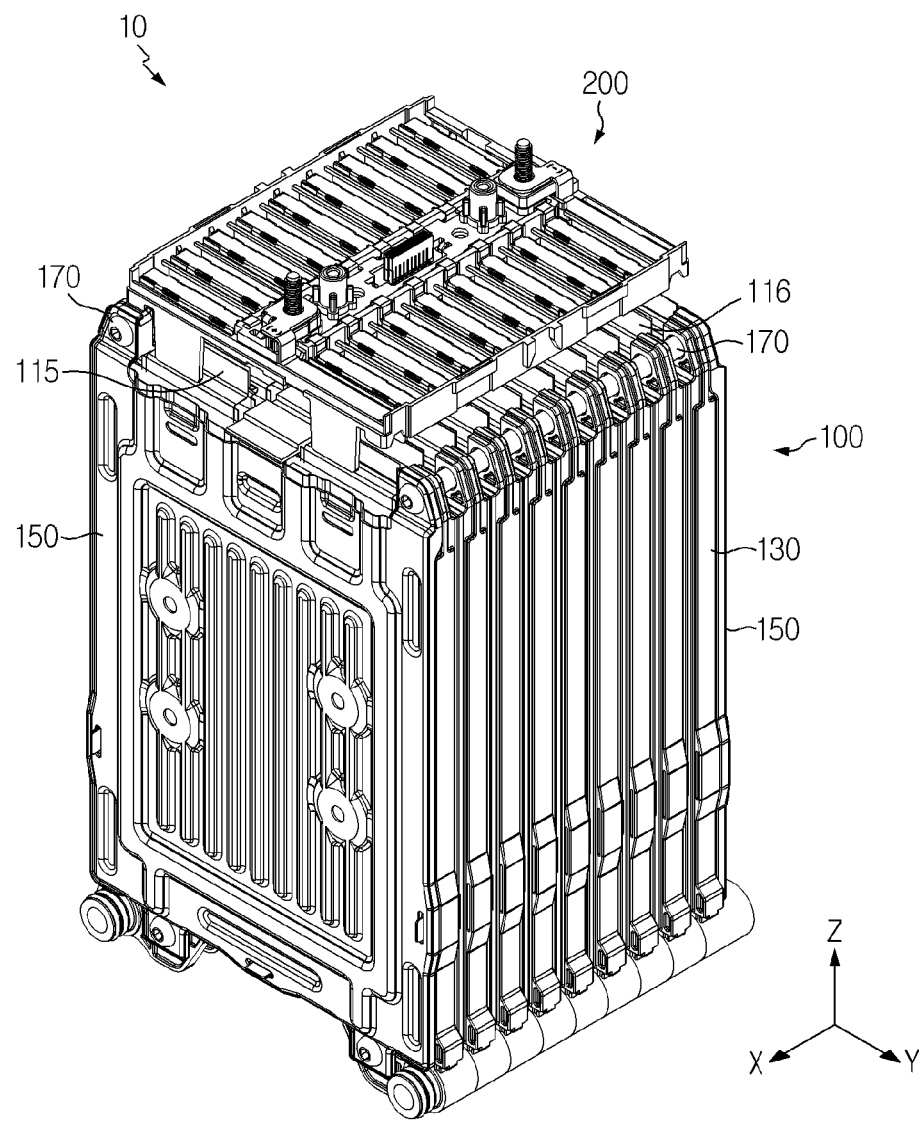
FIG. 3 is an exploded perspective view showing the battery module of FIG. 1.
Figure 4:
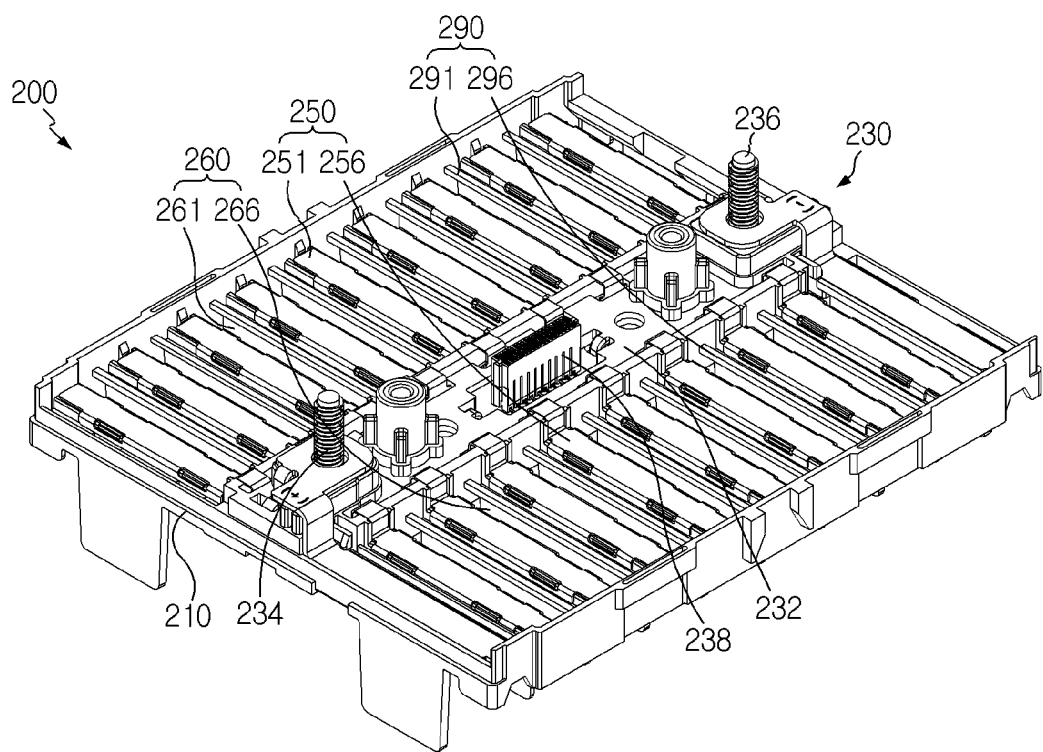
FIG. 4 is a perspective view showing an ICB assembly of the battery module of FIG. 3.
Figure 5:
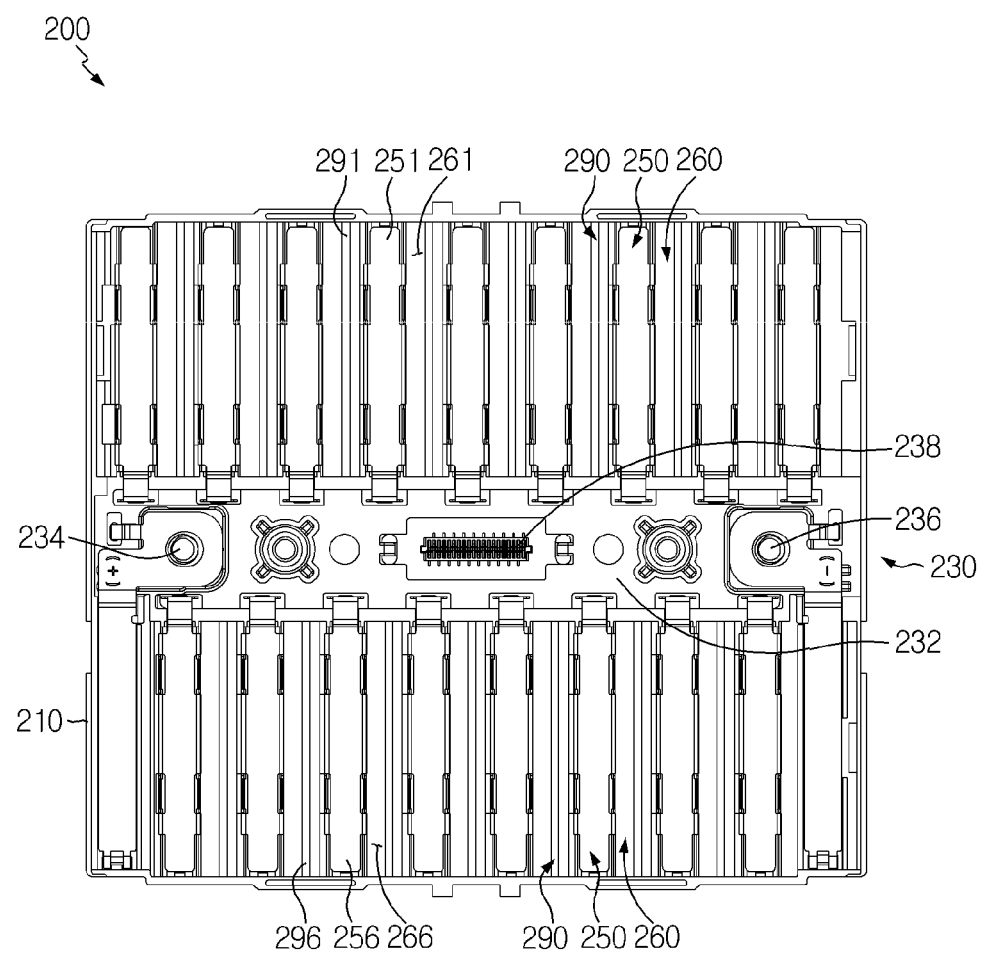
FIG. 5 is a plane view showing the ICB assembly of FIG. 4.

FIG. 1 is a perspective view showing a battery module according to an embodiment of the present disclosure, FIG. 2 is a cross-sectioned view showing the battery module of FIG. 1, FIG. 3 is an exploded perspective view showing the battery module of FIG. 1, FIG. 4 is a perspective view showing an ICB assembly of the battery module of FIG. 3, and FIG. 5 is a plane view showing the ICB assembly of FIG. 4.

Referring to FIGS. 1 to 5, a battery module 10 may include a battery cell assembly 100 and an ICB assembly 200.

The battery cell assembly 100 is an assembly of major components of the battery module 10 and may include a battery cell 110, a cell cartridge 130, an end plate 150, and a coupling member 170.

The battery cell 110 may be provided in plural. The plurality of battery cells 110 are electrically connected to each other and may be stacked on one another along a front and rear direction (X-axial direction) of the battery cell assembly 100.

Each of the plurality of battery cells 110 may be provided as a pouch-type secondary battery. Each battery cell 110 may include an electrode assembly, a battery case for accommodating the electrode assembly, and electrode leads 115, 116 connected to the electrode assembly and protruding out of the battery case.

The electrode leads 115, 116 may be provided in a pair. The pair of electrode leads 115, 116 may protrude from the battery cell 110 to one side of the battery cell assembly 100, specifically in an upper direction (+Z-axial direction) of the battery cell assembly 100.

The cell cartridges 130 may hold at least one battery cell 110 to prevent the at least one battery cell 110 from moving and be configured to be stacked on one another to guide assembling of the plurality of battery cells 110.

The cell cartridge 130 is provided in plural to guide assembling of the plurality of battery cells 110, and the plurality of cell cartridges 130 may be stacked on one another in a front and rear direction (X-axial direction).

The end plate 150 is used for securing the rigidity of the plurality of cell cartridges 130 and supporting the plurality of cell cartridges 130. The end plates 150 may be provided in a pair to cover the plurality of cell cartridges 130 in at a front side (+X-axial direction) and a rear side (−X-axial direction) of the plurality of cell cartridges 130.

The coupling member 170 is used for coupling the plurality of cell cartridges 130 and the pair of end plates 150 and may be a long bolt such as a shoulder bolt.

The ICB assembly 200 may electrically connect the pair of electrode leads 115, 116 of the plurality of battery cells 110. For this, the ICB assembly 200 may be assembled to the battery cell assembly 100 to cover one side of the battery cell assembly 100, specifically an upper side (+Z-axial direction) of the battery cell assembly 100.

The ICB assembly 200 may include an ICB frame 210, a PCB unit 230, a sensing bus bar 250, a lead slot 260, and a short-preventing rib 290.

The ICB frame 210 may be assembled and mounted to the battery cell assembly 100 to cover one side of the battery cell assembly 100, specifically an upper side (+Z-axial direction) of the battery cell assembly 100. The ICB frame 210 may include a plurality of lead slots 260, explained later.

The PCB unit 230 may be provided at the ICB frame 210. The PCB unit 230 may be disposed between a plurality of first bus bars 251 and a plurality of second bus bars 256, explained later, and may be electrically connected to the plurality of first bus bars 251 and the plurality of second bus bars 256, explained later.

The PCB unit 230 may include a PCB board 232, a pair of terminal bus bars 234, 236, and a connector 238.

The PCB board 232 is provided approximately at a center of the ICB frame 210 and may be disposed along a front and rear direction (X-axial direction) of the ICB frame 210.

The pair of terminal bus bars 234, 236 protrudes from an upper side (+Z-axial direction) of the PCB board 232 and may be electrically connected to the PCB board 232. The pair of terminal bus bars 234, 236 may be electrically connected to an external device such as an external power source.

The connector 238 is provided at an upper side (+Z-axial direction) of the PCB board 232 and may be disposed between the pair of terminals 234, 236. The connector 238 may be electrically connected to a sensing connector for sensing a voltage of the battery cell assembly 100.

The sensing bus bar 250 is provided at the ICB frame 210 and may be provided in plural. The plurality of sensing bus bars 250 may be respectively in surface contact with the electrode leads 115, 116, respectively and be connected thereto by means of laser welding or the like to be electrically connected to the electrode leads 115, 116, which pass through a plurality of lead slots 260, explained later.

The plurality of sensing bus bars 250 may include a first bus bar 251 and a second bus bar 256.

The first bus bar 251 is disposed at a left side (−Y-axial direction) of the PCB unit 230 and may be provided in plural. The plurality of first bus bars 251 may be spaced at regular intervals along a front and rear direction (+X-axial direction) of the ICB frame 210.

The plurality of first bus bars 251 may be respectively in surface contact with any one electrode leads 115 among the pair of electrode leads 115, 116 of the facing battery cells 110, which commonly pass through the plurality of first slots 261, explained later, and be electrically connected thereto by means of laser welding or the like.

The second bus bar 256 is disposed at a right side (+Y-axial direction) of the PCB unit 230 and may be provided in plural. The plurality of second bus bars 256 may be spaced at regular intervals along a front and rear direction (+X-axial direction) of the ICB frame 210.

The plurality of second bus bars 256 may be respectively in surface contact with the other electrode leads 116 among the pair of electrode leads 115, 116 of the facing battery cells 110, which commonly pass through the plurality of second slots 266, explained later, and be electrically connected thereto by means of laser welding or the like.

The lead slots 260 are provided at the ICB frame 210 and may be provided in plural. The electrode leads 115, 116 of the facing battery cells 110 may pass through the plurality of lead slots 260 in common.

In detail, the plurality of lead slots 260 may be disposed between the plurality of sensing bus bars 250, respectively, and when the ICB assembly 200 is assembled and mounted to the battery cell assembly 100, the electrode leads 115, 116 of the facing battery cells 110 may pass through the plurality of lead slots 260 in common to an upper side (+Z-axial direction) of the ICB frame 210.

The plurality of lead slots 260 may include a first slot 261 and a second slot 266.

The first slot 261 may be provided in plural. The plurality of first slots 261 may be disposed adjacent to the plurality of first bus bars 251, respectively, and may pass through any one electrode leads 115 in common among the pair of electrode leads 115, 116 of the facing battery cells 110.

The second slot 266 may be provided in a plural. The plurality of second slots 266 may be disposed adjacent to the plurality of second bus bars 256, respectively, and may pass through the other electrode lead 116 in common among the pair of electrode leads 115, 116 of the facing battery cells 110.

The short-preventing rib 290 is provided at the ICB frame 210 and may prevent a short circuit between the electrode leads 115, 116 which pass through the corresponding lead slot 260.

The short-preventing rib 290 may be provided in plural. The plurality of short-preventing ribs 290 may be disposed between the lead slots 260 and the sensing bus bars 250, respectively, to prevent a short circuit between adjacent electrode leads 115, 116 passing through each lead slot 260.

The plurality of short-preventing ribs 290 may include a first insulating rib 291 and a second insulating rib 296.

The first insulating rib 291 may be provided in plural. The plurality of first insulating ribs 291 may be disposed between the first slots 261 and the first bus bars 251, respectively.

This plurality of first insulating ribs 291 may block contact between adjacent electrode leads 115 passing through each first slot 261 to prevent a short circuit of the adjacent electrode leads 115.

The second insulating rib 296 may be provided in plural. The plurality of second insulating ribs 296 may be disposed between the second slots 266 and the second bus bars 256, respectively.

This plurality of second insulating ribs 296 may block contact between adjacent electrode leads 116 passing through each second slot 266 to prevent a short circuit of the adjacent electrode leads 116.

Hereinafter, a process of assembling the battery cell assembly 100 and the ICB assembly 200 of the battery module 10 according to this embodiment will be described in detail.

FIGS. 6 to 14 are diagrams for illustrating a process of assembling the battery cell assembly and the ICB assembly of the battery module depicted in FIG. 1.

Figure 6:
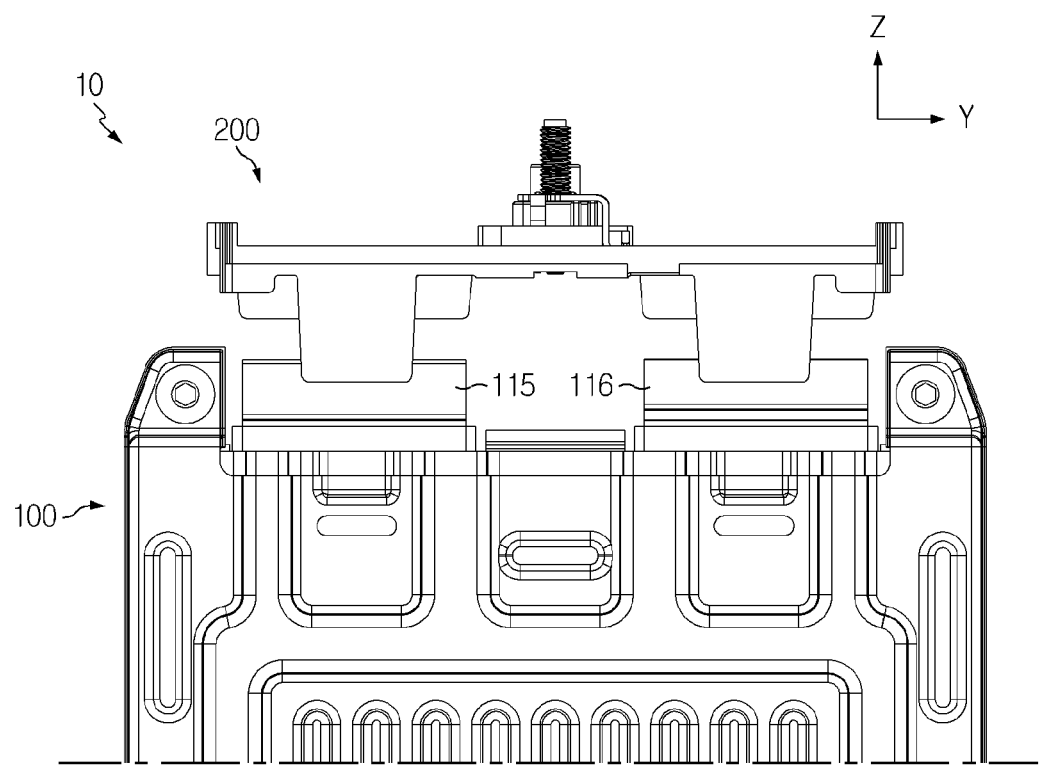
FIGS. 6 to 14 are diagrams for illustrating a process of assembling the battery cell assembly and the ICB assembly of the battery module depicted in FIG. 1.
Figure 7:
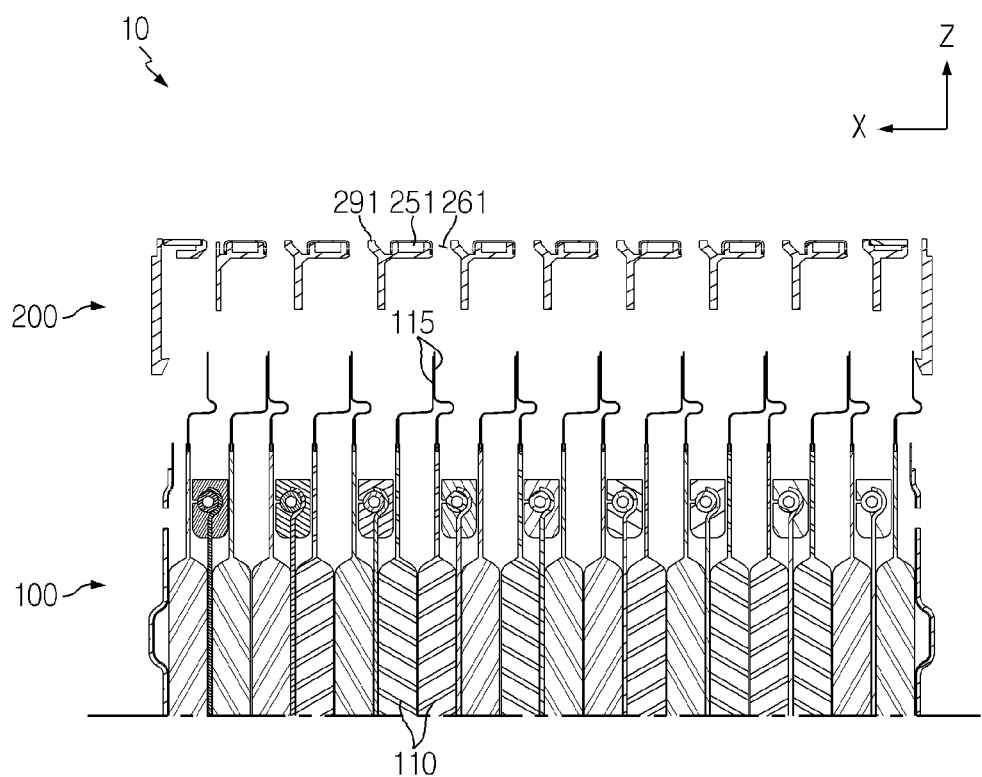

Referring to FIGS. 6 and 7, when the battery cell assembly 100 and the ICB assembly 200 of the battery module 10 are assembled, a manufacturer or the like may dispose the ICB assembly 200 at an upper side (+Z-axial direction) of the cell assembly 100 where the electrode leads 115, 116 of the battery cells 110 protrude.

First, the manufacturer or the like may adhere the facing electrode leads 115, 116 of the facing battery cells 110 of the battery cell assembly 100 to each other.

In detail, the manufacturer or the like may couple the facing electrode leads 115 of the facing battery cells 110, disposed at a left side (−Y-axial direction) of the battery cell assembly 100. This coupling may be performed by welding or the like.

Similarly, the manufacturer or the like may couple the facing electrode leads 116 of the facing battery cells 110, disposed at a right side (+Y-axial direction) of the battery cell assembly 100. This coupling may be performed by welding or the like.

In addition, the manufacturer or the like may dispose the ICB assembly 200 at an upper side (+Z-axial direction) of the battery cell assembly 100 so that the plurality of lead slots 260 are disposed at an upper side (+Z-axial direction) of the electrode leads 115, 116 adhered to each other.

In detail, the manufacturer or the like may dispose the plurality of first slots 261 at an upper side (+Z-axial direction) of the adhered electrode leads 115 of the facing battery cells 110.

Similarly, the manufacturer or the like may dispose the plurality of second slots 266 (see FIG. 8) at an upper side (+Z-axial direction) of the adhered electrode leads 116 of the facing battery cells 110.

Figure 8:
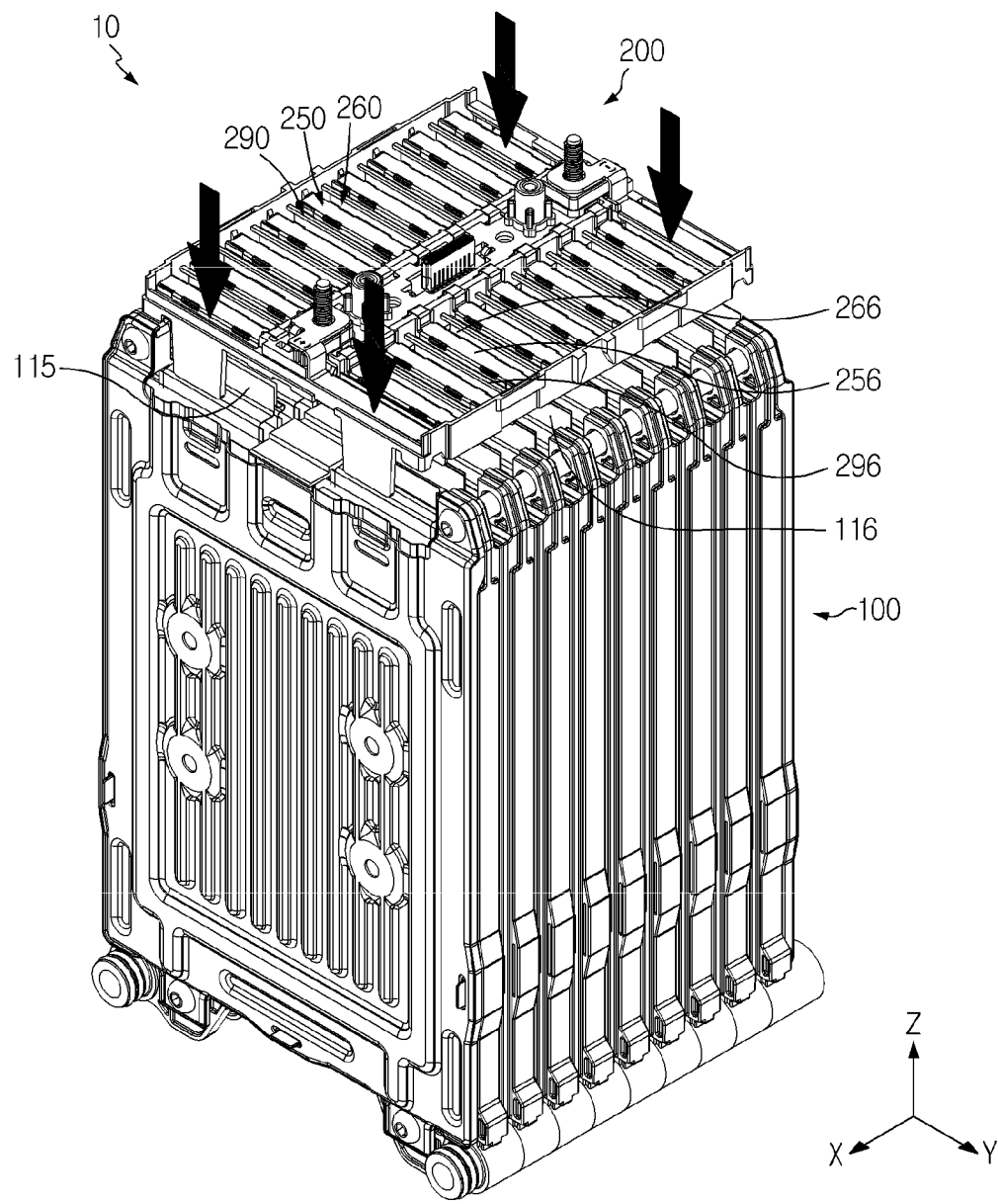
Figure 9:
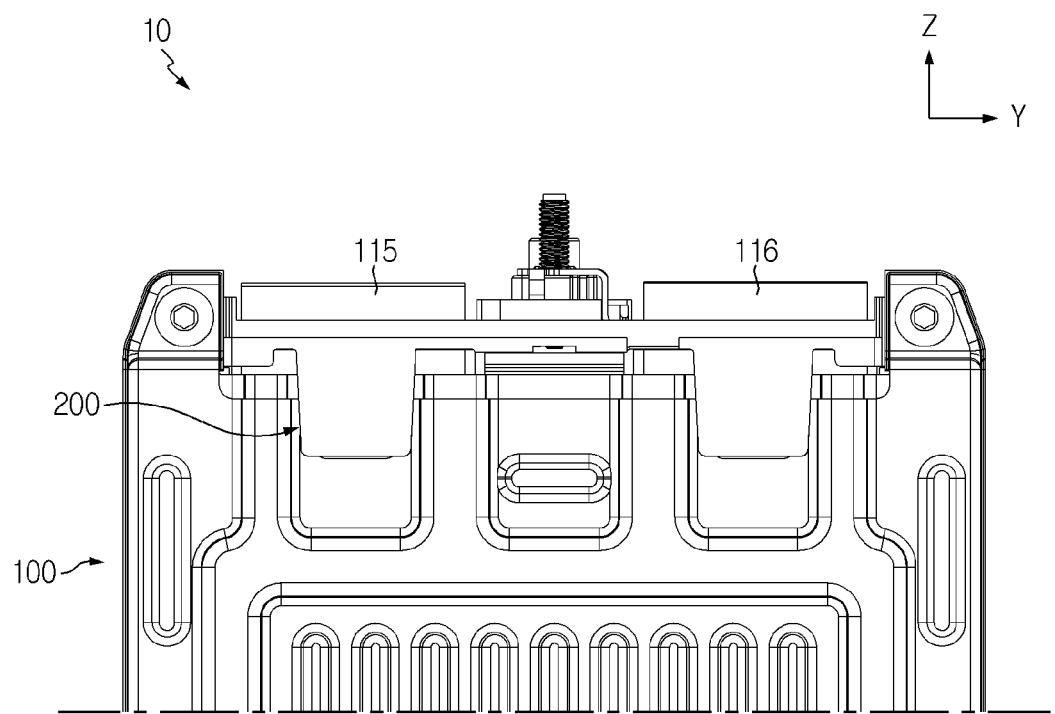
Figure 10:
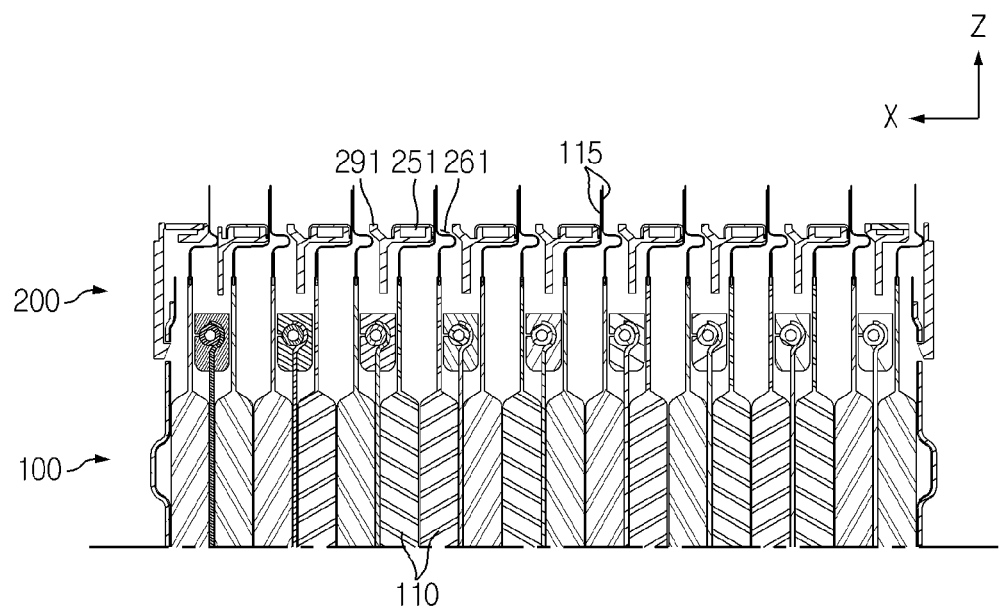
Figure 11:
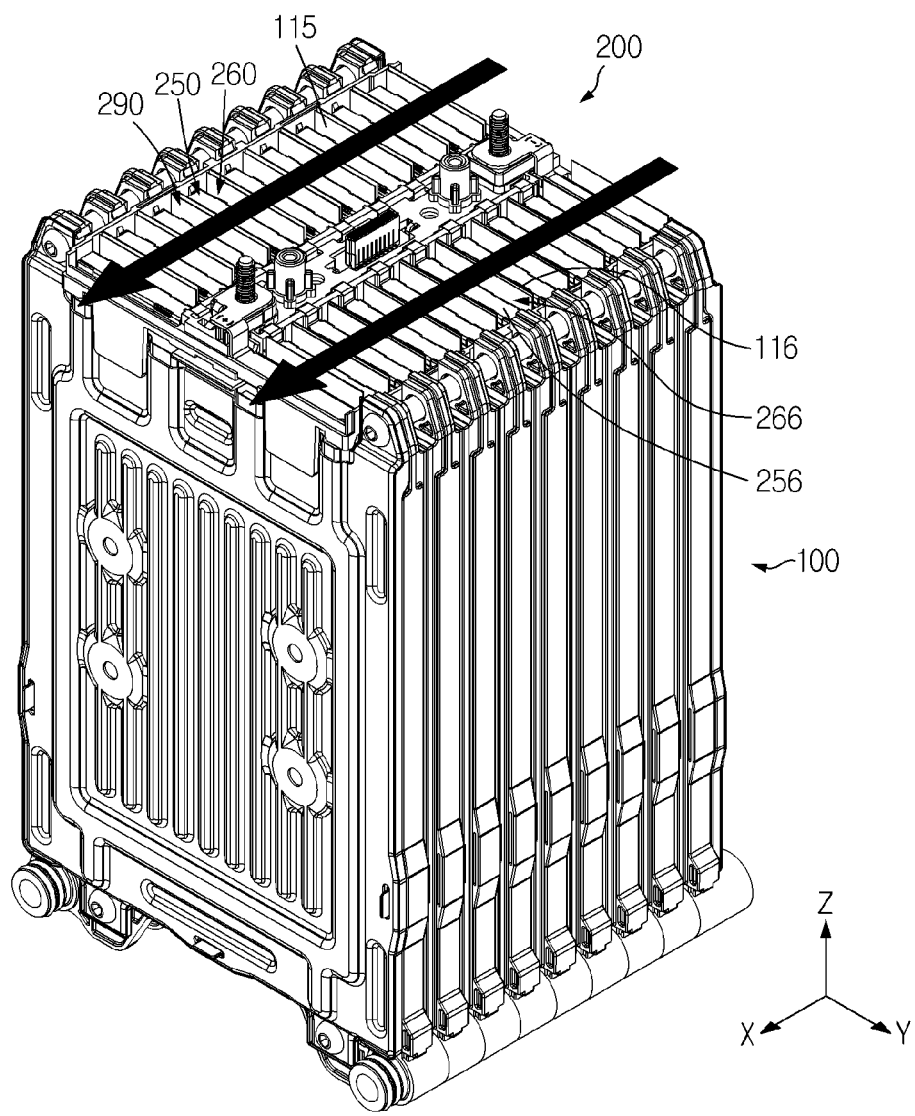
Figure 12:
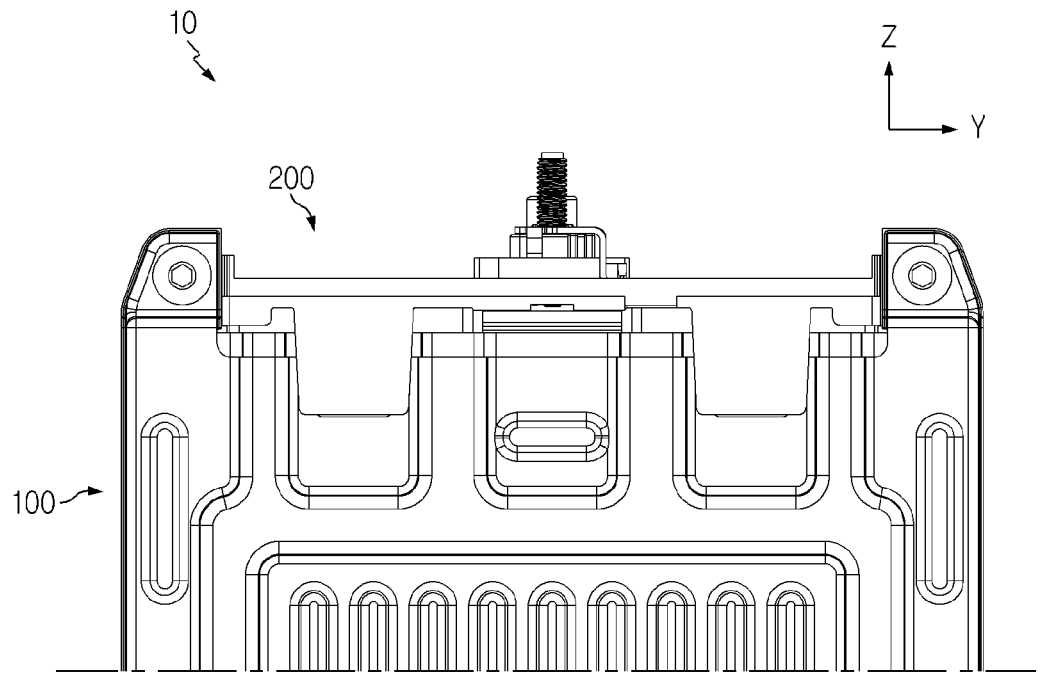
Figure 13:
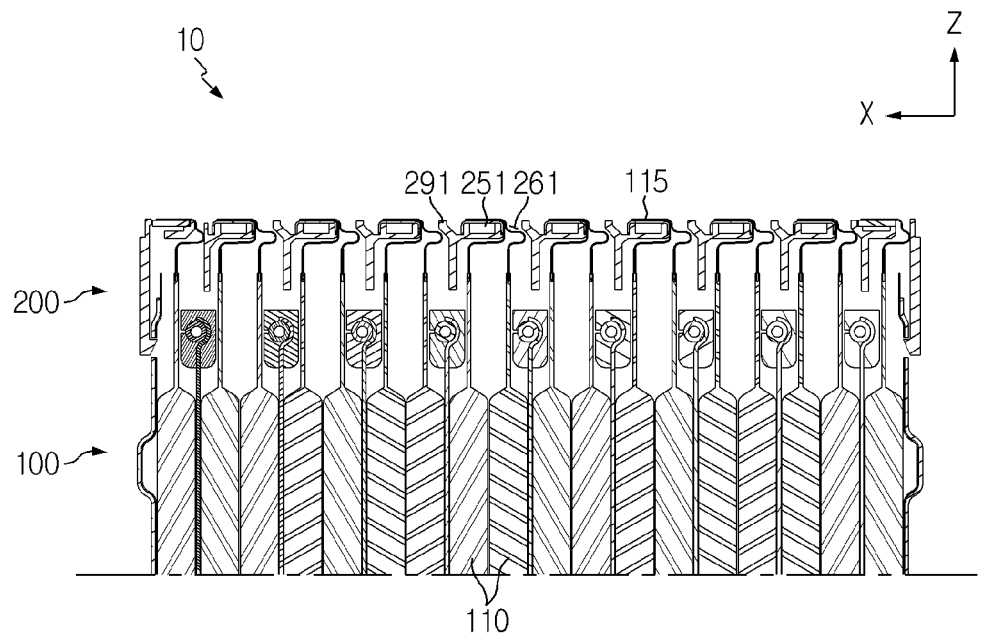
Figure 14:
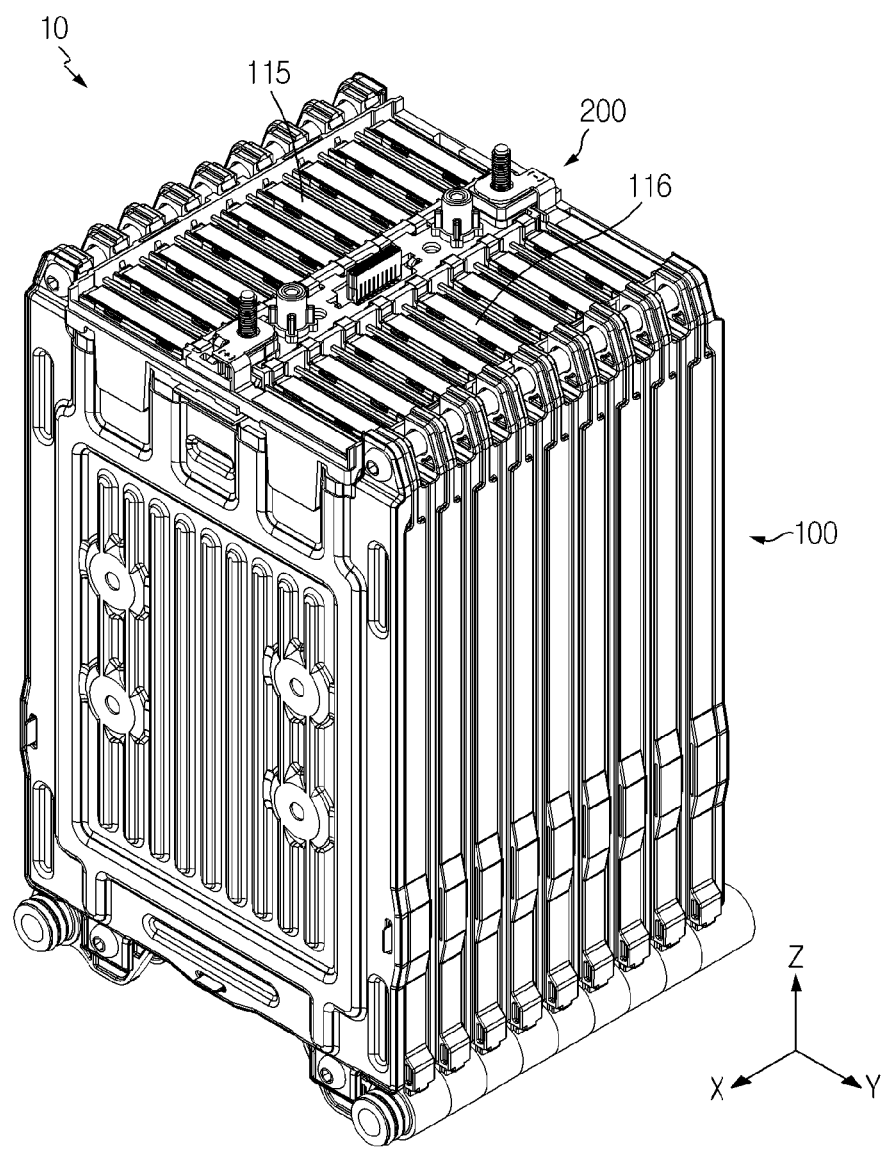

Referring to FIGS. 8 to 10, after that, the manufacturer or the like may press the ICB assembly 200 in a lower direction (−Z-axial direction) to be mounted to the battery cell assembly 100.

At this time, the adhered electrode leads 115, 116 may protrude in an upper side (+Z-axial direction) of the ICB assembly 200 while passing through the plurality of lead slots 260, respectively.

In detail, the adhered electrode leads 115 disposed at the left side (−Y-axial direction) of the battery cell assembly 100 may protrude in an upper direction (+Z-axial direction) of the ICB assembly 200 while passing through the plurality of first slots 261 in common, respectively.

Similarly, the adhered electrode leads 116 disposed at an right side (+Y-axial direction) of the battery cell assembly 100 may protrude in an upper direction (+Z-axial direction) of the ICB assembly 200 while passing through the plurality of second slots 266 in common, respectively.

As described above, in the battery module 10 of this embodiment, the electrode leads 115, 116 of the facing battery cells 110 pass through the plurality of lead slots 260 in common, and thus the number of the plurality of lead slots 260 may be reduced to about half, compared to the case where the electrode leads 115, 116 of the battery cells 110 pass the plurality of lead slots 260 individually.

Accordingly, in the battery module 10 of this embodiment, when the ICB assembly 200 is mounted to the battery cell assembly 100, the electrode leads 115, 116 may pass through the plurality of lead slots 260 less frequently, thereby improving the efficiency of the assembling process.

Moreover, in the battery module 10 of this embodiment, since the number of the lead slots 260 decreases, each lead slot 260 may have a greater width as much in a front and rear direction (X-axial direction) of the ICB assembly 200. Thus, the plurality of electrode leads 115, 116 may more easily pass through the plurality of lead slots 260.

Referring to FIGS. 11 to 14, after that, the manufacturer or the like may bend the electrode leads 115, 116 passing through each lead slot 260 in one direction so as to make surface contact with the sensing bus bar 250 adjacent thereto.

Here, the electrode leads 115, 116 may be bent in a front direction (+X-axial direction) or a rear direction (−Y-axial direction) of the ICB assembly 200. Hereinafter, in this embodiment, it is assumed that the electrode leads 115, 116 are bent in a front direction (+X-axial direction) of the ICB assembly 200.

After that, the manufacturer or the like may electrically connect the plurality of electrode leads 115, 116, which are bent in one direction (+X-axial direction) to make surface contact with the plurality of sensing bus bars 250, to the plurality of sensing bus bars 250. Here, the bending may be performed using a device such as a bending tool.

In detail, the manufacturer or the like may bend the plurality of electrode leads 115, which pass through the plurality of first slots 261, in a front direction (+X-axial direction) of the ICB assembly 200 to make surface contact with the plurality of first bus bars 251 adjacent thereto.

In addition, the manufacturer or the like may electrically connect the plurality of electrode leads 115 and the plurality of first bus bars 251 by laser welding or the like. Here, the plurality of first insulating ribs 291 may prevent a short circuit of the electrode leads 115 by blocking contact between the adjacent electrode leads 115 as described above.

Similarly, the manufacturer or the like may bend the plurality of electrode leads 116, which pass through the plurality of second slots 266, in a front direction (+X-axial direction) of the ICB assembly 200 to make surface with the plurality of second bus bars 256 adjacent thereto.

In addition, the manufacturer or the like may electrically connect the plurality of electrode leads 116 and the plurality of second bus bars 256 by laser welding or the like. Here, the plurality of second insulating ribs 296 (see FIG. 8) may also prevent a short circuit of the electrode leads 11 by blocking contact between the adjacent electrode leads 116.

As described above, in the battery module 10 of this embodiment, since the electrode leads 115, 116 may be bent in a single direction, it is possible to simplify the bending process of the electrode leads 115, 116, thereby improving the efficiency of the assembly process.

As described above, in the battery module 10 of this embodiment, when the ICB assembly 200 is assembled to the battery cell assembly 100, the efficiency of the assembly process may be greatly improved.

Therefore, in the battery module 10 of this embodiment, the time of required for assembling the battery module 10 is shortened, thereby increasing the mass productivity of the battery module 10, and the product quality of the battery module 10 may be greatly improved.

Figure 15:
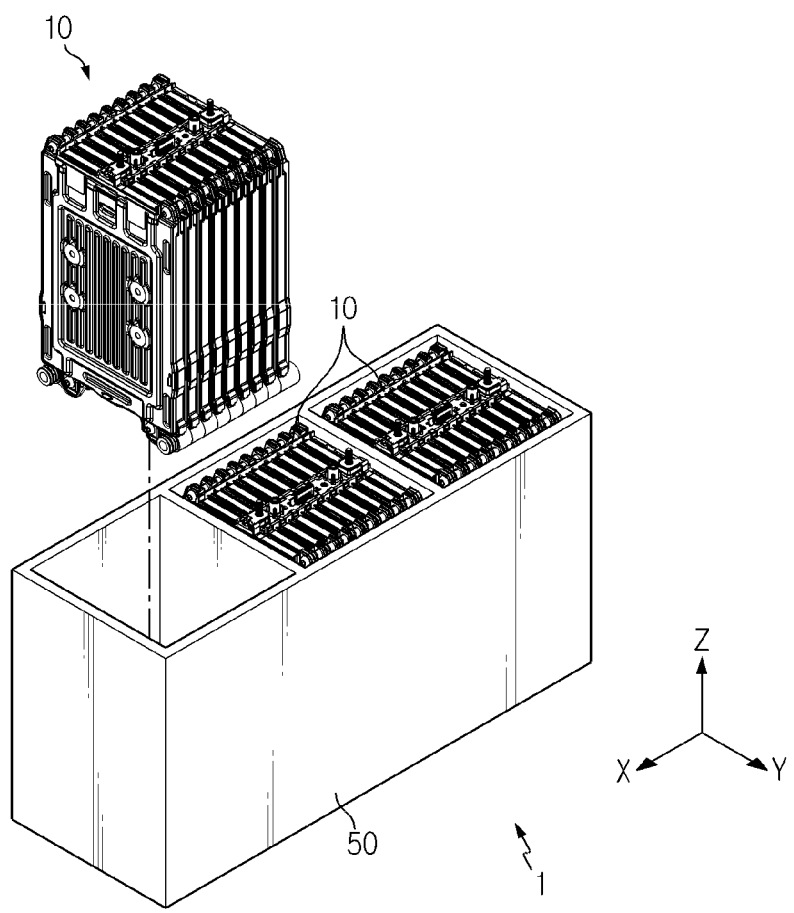
FIG. 15 is a diagram for illustrating a battery pack according to an embodiment of the present disclosure.

FIG. 15 is a diagram for illustrating a battery pack according to an embodiment of the present disclosure.

Referring to FIG. 15, a battery pack 1 may include at least one battery module 10 as described above and a pack case 50 for packaging the at least one battery module 10.

The battery pack 1 may serve as a fuel source of a vehicle, and at least one battery pack may be provided to a vehicle. As an example, the battery pack 1 may be provided to an electric vehicle, a hybrid vehicle, and various other-type vehicles capable of using the battery pack 1 as a fuel source.

In addition, the battery pack 1 may be provided in other devices, instruments or facilities such as an energy storage system using a secondary battery, in addition to the vehicle.

As described above, the battery pack 1 of this embodiment and devices, instruments or facilities such as a vehicle, which have the battery pack 1, include the battery module 10 as described above, and thus it is possible to implement a battery pack 1 having all the advantages of the battery module 10 described above, or devices, instruments, facilities or the like such as a vehicle, which have the battery pack 1.

While the embodiments of the present disclosure have been shown and described, it should be understood that the present disclosure is not limited to the specific embodiments described, and that various changes and modifications can be made within the scope of the present disclosure by those skilled in the art, and these modifications should not be understood individually from the technical ideas and views of the present disclosure.

What is claimed is:

1. A battery module, comprising:
   a battery cell assembly having a plurality of battery cells stacked on one another so that a pair of electrode leads protrudes on one side of each battery cell;
   a frame configured to cover one side of the battery cell assembly, the frame having a plurality of lead slots through each of which electrode leads of two battery cells facing each other pass in common;
   a plurality of sensing bus bars provided at the frame and electrically connected to the electrode leads passing through the plurality of lead slots; and
   a plurality of short-preventing ribs disposed between the lead slots and the sensing bus bars, respectively, each of the short-preventing ribs extending below a bottom surface of the frame,
   wherein the plurality of lead slots are disposed between the plurality of sensing bus bars, respectively.

2. The battery module according to claim 1, wherein the electrode leads passing through each lead slot in common are bent in a same direction and electrically connected to sensing bus bars adjacent thereto.

3. The battery module according to claim 2, wherein the electrode leads bent in the same direction are coupled to sensing bus bars adjacent thereto by means of welding.

4. The battery module according to claim 2, wherein the same direction is a front direction or a rear direction of the frame.

5. The battery module according to claim 1, wherein the plurality of lead slots include:
   a plurality of first slots through which any one electrode leads among the pair of electrode leads of the facing battery cells pass in common; and
   a plurality of second slots through which the other one electrode leads among the pair of electrode leads of the facing battery cells pass in common.

6. The battery module according to claim 5, wherein the plurality of sensing bus bars include:
   a plurality of first bus bars electrically connected to the electrode leads passing through the plurality of first slots in common, respectively; and
   a plurality of second bus bars electrically connected to the electrode leads passing through the plurality of second slots in common, respectively.

7. The battery module according to claim 6, wherein the plurality of short-preventing ribs include:
   a plurality of first insulating ribs disposed between the first slots and the first bus bars, respectively; and
   a plurality of second insulating ribs disposed between the second slots and the second bus bars, respectively.

8. The battery module according to claim 6, wherein the frame includes a printed circuit board provided at the frame to be disposed between the plurality of first bus bars and the plurality of second bus bars and electrically connected to the plurality of first bus bars and the plurality of second bus bars.

9. The battery module according to claim 1, wherein the plurality of short-preventing ribs include a first section extending below the bottom surface of the frame and a second section extending above a top surface of the frame.

10. The battery module according to claim 9, wherein each of the plurality of short-preventing ribs is formed at an edge of a respective slot.

11. The battery module according to claim 10, wherein the second section of each of the plurality of short-preventing ribs is angled to extend over the respective slot.

12. The battery module according to claim 1, wherein the frame comprises a plurality of recesses in a top surface, and wherein each of the plurality of sensing bus bars is retained in one of the plurality of recesses.

13. A battery pack, comprising:
   at least one battery module defined in claim 1; and
   a pack case configured to package the at least one battery module.

14. A vehicle, comprising at least one battery pack defined in claim 13.

* * * * *